(12) United States Patent
Lee et al.

(10) Patent No.: US 7,382,982 B2
(45) Date of Patent: Jun. 3, 2008

(54) ETHERNET PASSIVE OPTICAL NETWORK FOR INTEGRATING BROADCAST AND COMMUNICATION BASED ON TIME DIVISION MULTIPLEXING SCHEME

(75) Inventors: Ki-Cheol Lee, Suwon-si (KR); Yun-Je Oh, Yongin-si (KR); Kee-Sung Nam, Seoul (KR); Tae-Sung Park, Yongin-si (KR)

(73) Assignee: Samsung Electronics Co., Ltd., Maetan-Dong, Yeongtong-Gu, Suwon-Si, Gyeonggi-Do (KR)

( * ) Notice: Subject to any disclaimer, the term of this patent is extended or adjusted under 35 U.S.C. 154(b) by 560 days.

(21) Appl. No.: 10/811,600

(22) Filed: Mar. 29, 2004

(65) Prior Publication Data

US 2005/0069318 A1   Mar. 31, 2005

(30) Foreign Application Priority Data

Sep. 26, 2003   (KR) ...................... 10-2003-0067087

(51) Int. Cl.
*H04J 14/08*   (2006.01)
(52) U.S. Cl. .......................... 398/100; 398/66; 398/70; 398/71; 398/99
(58) Field of Classification Search ............... 398/100, 398/66, 98, 99
See application file for complete search history.

(56) References Cited

U.S. PATENT DOCUMENTS

| | | | | |
|---|---|---|---|---|
| 4,567,586 A | * | 1/1986 | Koeck ......................... | 398/100 |
| 4,994,909 A | * | 2/1991 | Graves et al. ................ | 725/92 |
| 5,150,247 A | * | 9/1992 | Sharpe et al. ................. | 398/98 |
| 5,576,874 A | * | 11/1996 | Czerwiec et al. ............. | 398/75 |
| 6,324,184 B1 | * | 11/2001 | Hou et al. .................... | 370/468 |
| 6,411,410 B1 | * | 6/2002 | Wright et al. ................. | 398/79 |
| 6,498,667 B1 | * | 12/2002 | Masucci et al. .............. | 398/98 |
| 6,684,031 B1 | * | 1/2004 | Kogelnik et al. ............. | 398/99 |
| 6,697,374 B1 | * | 2/2004 | Shraga et al. ................ | 370/458 |
| 6,778,550 B1 | * | 8/2004 | Blahut ......................... | 370/443 |
| 6,796,555 B1 | * | 9/2004 | Blahut ..................... | 370/395.1 |
| 2002/0163695 A1 | * | 11/2002 | Unitt et al. .................. | 359/137 |

(Continued)

FOREIGN PATENT DOCUMENTS

CN   1244751   2/2000

(Continued)

*Primary Examiner*—Kenneth Vanderpuye
*Assistant Examiner*—Thi Q. Le
(74) *Attorney, Agent, or Firm*—Cha & Reiter, LLC

(57) ABSTRACT

An Ethernet-PON integrates broadcast/communication through time division multiplexing, which provides users with high-speed, high-volume communication data and high-quality, real-time digital broadcast/image data. An OLT performs a switching operation on a plurality of digital broadcast/image data received from an external broadcaster according to respective broadcast/image selection information from users, time-division-multiplexes the data into a broadcast/image signal, multiplexes the signal and communication data from an IP network into a frame, and electro-optically converts the frame and transmits to the frame to ONTs through an optical splitter. Each ONT receives and photoelectrically converts the signal from the OLT, and performs frame & time-slot demultiplexing to output the entire received communication signals and broadcast/image information contained in a time-slot assigned to the ONT to a corresponding user. The ONT receives a communication signal and broadcast/image selection information from the user, and outputs them to the OLT through the splitter.

16 Claims, 14 Drawing Sheets

U.S. PATENT DOCUMENTS

2003/0020991 A1* 1/2003 Chang .................. 359/168
2004/0022536 A1* 2/2004 Koh et al. .............. 398/41
2004/0114633 A1* 6/2004 Mallya ................. 370/505
2005/0259541 A1* 11/2005 Suzuki et al. .......... 369/53.1

FOREIGN PATENT DOCUMENTS

| JP | 2003-018209 | 1/2003 |
| JP | 2003-092583 | 3/2003 |
| JP | 2003-101560 | 4/2003 |

* cited by examiner

ETHERNET PASSIVE OPTICAL NETWORK FOR INTEGRATING BROADCAST AND COMMUNICATION BASED ON TIME DIVISION MULTIPLEXING SCHEME

CLAIM OF PRIORITY

This application claims priority from an application entitled "ETHERNET PASSIVE OPTICAL NETWORK FOR INTEGRATING BROADCAST AND COMMUNICATION BASED ON TIME DIVISION MULTIPLEXING SCHEME," filed in the Korean Intellectual Property Office on Sep. 26, 2003 and assigned Ser. No. 2003-67087, the contents of which are hereby incorporated by reference.

BACKGROUND OF THE INVENTION

1. Field of the Invention

The present invention relates to optical transmission. More particularly, the present invention relates to an Ethernet passive optical network (Ethernet-PON) for providing high-volume, high-speed data services and real-time broadcast/image services to subscribers.

2. Description of the Related Art

Data transfer rates above 100 Mb/s are required to provide efficient high-volume, high-speed data services and real-time digital broadcast/image services to subscribers. However, for current network systems including those using a cable modem or xDSL to provide the high-volume it is impossible to achieve high-speed data services and real-time digital broadcast/image services since the systems have transfer rates of no more than 50 Mb/s. Thus, there has been a great deal of research in the area of providing a high-speed transmission network capable of providing high-volume, high-speed data services and real-time digital broadcast/image services. An optical network has been proposed as a potential solution for providing the backbone of such a high-speed transmission network. In particular, a passive optical network (PON) is attracting attention as an economically sound way to implement the optical network. There are various PONs, such as a PON based on Asynchronous Transfer Mode (ATM-PON), a PON based on Wavelength Division Multiplexing (WDM-PON) and a PON based on Ethernet (Ethernet-PON or EPON). An EPON-based FTTH (Fiber To The Home) system has been proposed and developed as a system capable of enabling high-speed optical transmission to general residences.

In general, the Ethernet-PON has been developed basically in order to accommodate communication data signals in an Ethernet network. Data transmission in the Ethernet-PON is performed in a manner such that Gigabit Ethernet signals are transmitted at 1.25 Gb/s from an optical line terminal (OLT) to an optical network terminations (ONTs) at a wavelength of 1550 nm, whereas Gigabit Ethernet signals are transmitted at 1.25 Gb/s from the ONTs to the OLT at a wavelength of 1310 nm. As a demand for broadcast services through the optical network increases, there is also an increased need to allow the Ethernet-PON to accommodate broadcast signals. To meet the need, an overlay broadcast accommodation system has been proposed in which broadcast signals are transmitted to the ONTs through a different wavelength for broadcast signals from the wavelength for communication data, as shown in FIG. 1. FIG. 1 illustrates the configuration of a general Ethernet-PON for integrating broadcast and communication functions. As shown in FIG. 1, the Ethernet-PON for integrating broadcast and communication includes an OLT (Optical Line Terminal) 100, a plurality of ONTs (Optical Network Terminals) 200-1 to 200-N, and a passive optical splitter 118. In addition, there are also optical cables for connecting the OLT 100 with the ONTs 200-1 to 200-N. The OLT 100 is a subsystem positioned between a service node and users, which receives broadcast and communication signals transmitted from broadcast and communication providers, and combines them into an optical signal after electro-optical conversion, and then subsequently transmits the optical signal. The ONTs 200-1 to 200-N are user-side devices for transferring information received from the OLT 100 to users.

In a more detailed explanation, the OLT 100 optically converts a broadcast signal received from a broadcast network through (optical/electrical) O/E and E/O (electric/optical) converters 115 and 116, and then transmits the converted signal after optically amplifying it through an EDFA (Erbium Doped Fiber Amplifier) 117. On the other hand, the OLT 100 receives communication data from an IP (Internet Protocol) network through an IP router 111, and processes it into an optical signal through an E-PON OLT function processor 112, and then transmits it through a transmitter 113. In addition, the OLT 100 receives data from the ONTs 200-1 to 200-N, and transmits it to the IP network through the IP router 111.

The ONTs 200-1 to 200-N receive broadcast signals through broadcast receivers 119-1 to 119-N, and transfer them to users through broadcast STBs (SetTop Box) 122-1 to 122-N. In addition, the ONTs 200-1 to 200-N receive communication data through receivers 120-1 to 120-N, and transfer it to users through E-PON ONT function processors 123-1 to 123-N.

Moreover, the ONTs 200-1 to 200-N receive communication data sent from users through the E-PON ONT function processors 123-1 to 123-N, and transmit it to the OLT 100 through the burst-mode transmitters 121-1 to 121-N.

In such a conventional Ethernet-PON system for accommodating broadcast signals as shown in FIG. 1, there is a requirement to provide the EDFA 117, a high-priced optical amplifier for broadcast signal amplification, in order to transfer analog broadcast signals from the OLT 100 to the ONTs 200-1 to 200-N. It should also be noted that even when the conventional Ethernet-PON system accommodates only digital broadcast signals no other signals such as analog broadcast signals, the E-PON system must be provided with the high-priced EDFA 117 if there are a large number of digital broadcast channels.

Further, since all broadcast channels are transmitted to each of the ONTs 200-1 to 200-N, it is also required that in order to receive the transmitted broadcast signals, the ONTs 200-1 to 200-N to include a high spec, high cost optical receiver, which has high reception sensitivity and excellent noise characteristics.

In the future, it is expected that users will demand not only digital broadcast services but also high-quality, real-time digital image services. However, there is still difficulty for the conventional Ethernet-PON to accommodate the high-quality, real-time digital image signals.

Moreover, there has been no suggestion as to how to transmit specific broadcast information from the ONTs 200-1 to 200-N to the OLT 100, in the conventional Ethernet-PON system, and it is thus difficult to implement bi-directional broadcasting functions that will be required in the future on conventional Ethernet-PON.

SUMMARY OF THE INVENTION

Therefore, the present invention has been made partly in view of the above-mentioned problems. The present invention provides an Ethernet-PON for integrating broadcast and communication based on a TDM (Time Division Multiplexing) scheme that provides users with not only high-speed high-volume communication data, but also high-image-quality, real-time digital broadcast/image data.

It is an aspect of the present invention to provide an Ethernet-PON for integrating both broadcast and communication based on a TDM scheme, wherein broadcast channels desired by users are selected at an OLT to be transmitted to ONTs, thereby allowing the ONTs to use a low cost, low spec optical receiver for receiving broadcast signals, instead of an EDFA for a large amount of broadcast signals.

Another aspect of the present invention provides an Ethernet-PON for integrating both broadcast and communication based on a TDM scheme, which can ensure QoS (Quality of Service) in transmitting not only digital broadcast signals but also high-image-quality digital image signals that will be required by future users.

Yet another aspect of the present invention is to provide an Ethernet-PON for integrating broadcast and communication based on a TDM scheme, in which broadcast information is transmitted through a communication data line in the Ethernet-PON, thereby enabling bi-directional broadcasting functions.

BRIEF DESCRIPTION OF THE DRAWINGS

The above and other advantages of the present invention will be more clearly understood from the following detailed description taken in conjunction with the accompanying drawings, in which.

DETAILED DESCRIPTION OF THE INVENTION

Figure 1:
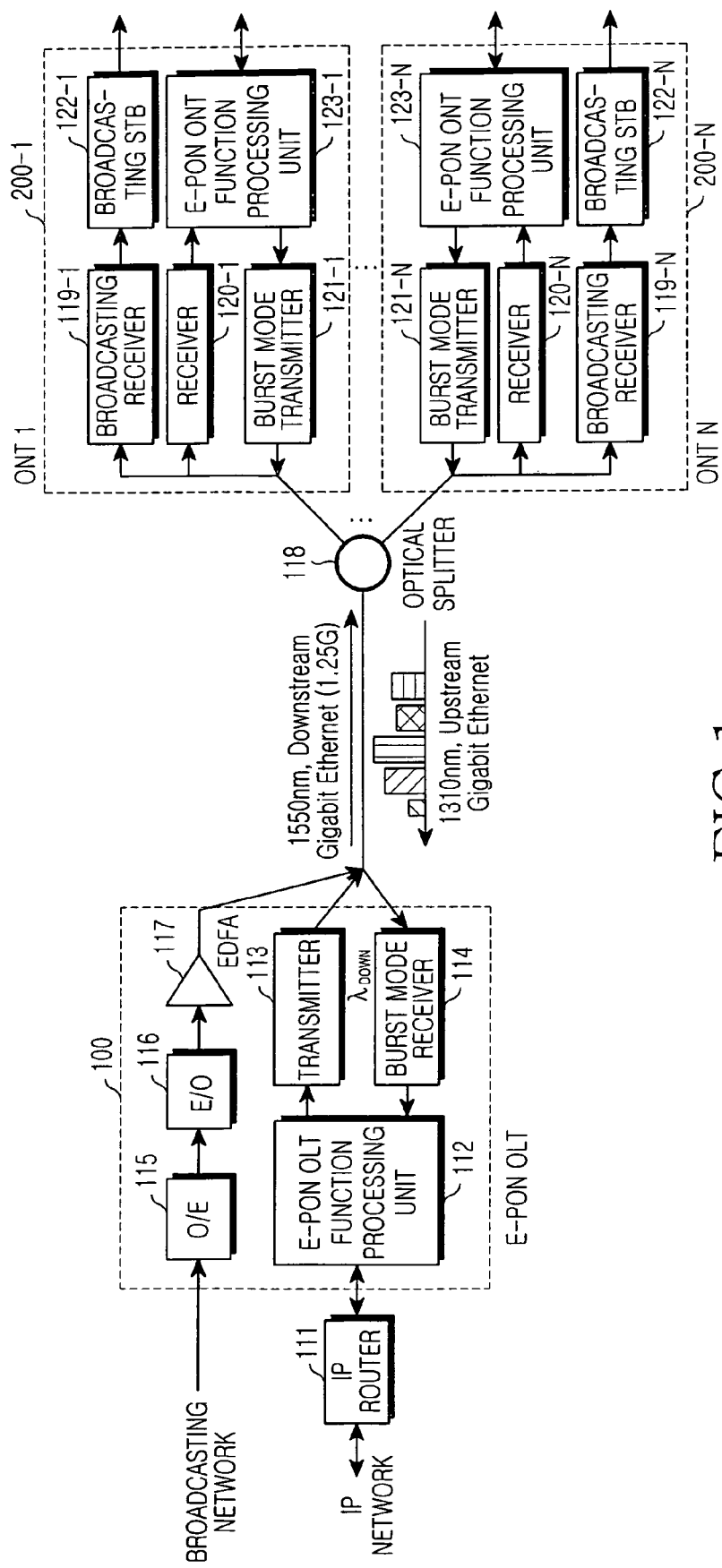
FIG. 1 shows the configuration of a general conventional Ethernet passive optical network (Ethernet-PON) for integrating broadcast and communication.

The present invention will be described in detail with reference to the accompanying drawings. In the drawings, the same or similar elements are denoted by the same reference numerals even though they are depicted in different drawings. For the purposes of clarity and simplicity, a detailed description of known functions and configurations incorporated herein will be omitted as it may make the subject matter of the present invention unclear.

Figure 2A:
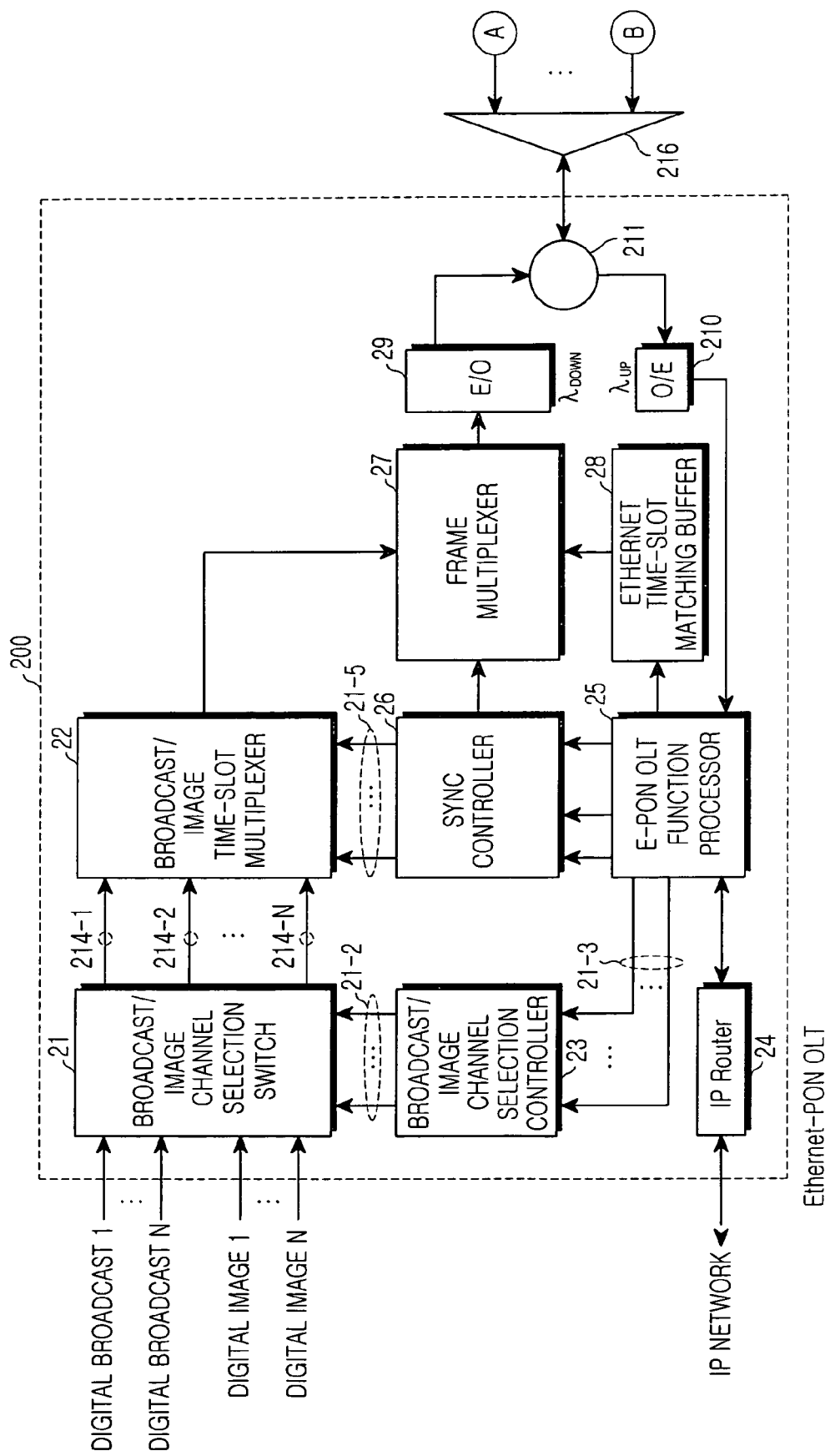
FIGS. 2A and 2B show the configuration of an Ethernet-PON for integrating broadcast and communication based on a TDM scheme according to an aspect of the present invention.
Figure 2B:
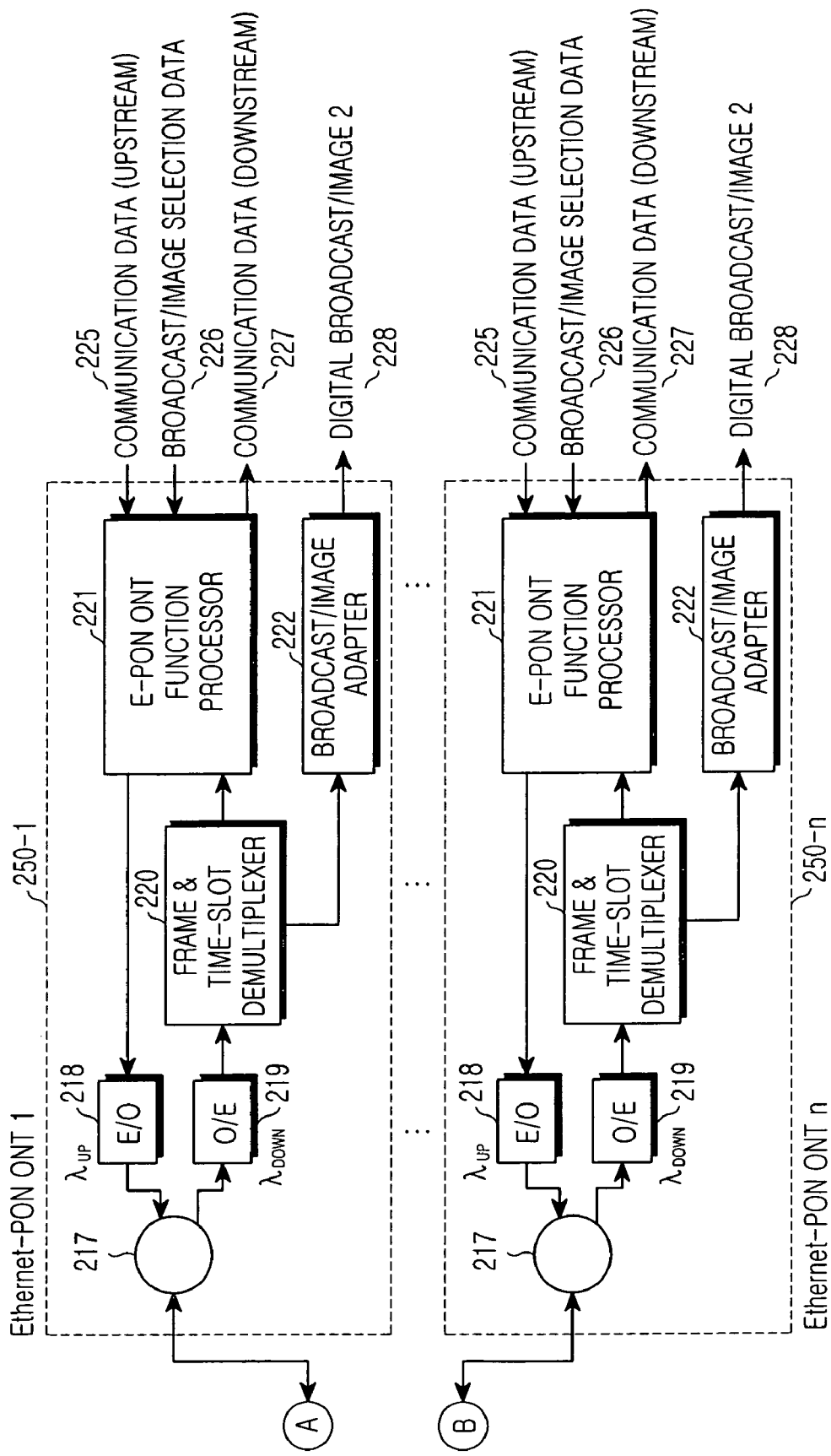

FIGS. 2A and 2B show the configuration of an Ethernet passive optical network (Ethernet-PON) for integrating broadcast and communication based on a TDM scheme, according to an aspect of the present invention.

As shown FIG. 2A, the Ethernet-PON includes a single OLT 200, an optical splitter 216, and n ONTs. The n ONTs are assigned to n users, respectively. In other words, for each user, one ONT is connected to the network.

The Ethernet-PON according to the present invention is configured as follows. The OLT 200 includes a broadcast/image channel selection switch 21, a broadcast/image time-slot multiplexer 22, a broadcast/image channel selection controller 23, an IP router 24, an E-PON OLT function processor 25, a synchronization controller 26, a frame multiplexer 27, an Ethernet time-slot matching buffer 28, an optical transmitter 29, an optical receiver 210, and a WDM coupler 211. The broadcast/image channel selection switch 21 performs a switching operation on MPEG (Motion Picture Experts Group) broadcast/image data.

The broadcast/image channel selection controller 23 receives respective channel selection information from the ONTs 250-1 to 250-n, and transfers a control signal to the broadcast/image channel selection switch 21 so as to allow the switch 21 to select their respective broadcast/image channels.

The broadcast/image time-slot multiplexer 22 of FIG. 2A is connected to the broadcast/image channel selection switch 21 to multiplex the broadcast/image channels selected respectively by the subscribers into a single time-slot in a time division multiplexing (TDM) scheme. The IP router 24 routes communication data to an upper IP network or to the Ethernet-PON OLT function processor 25. The Ethernet-PON OLT function processor 25 performs Ethernet-PON OLT functions. The Ethernet time-slot matching buffer 28 stores communication data from the Ethernet-PON OLT function processor 25, which will be transmitted to the OLT, in order to match/couple it to the TDM (Time Division Multiplexed) broadcast/image signals.

The frame multiplexer 27 multiplexes a broadcast/image signal from the broadcast/image time-slot multiplexer 22 and an Ethernet communication signal from the Ethernet time-slot matching buffer 28 into a single frame. The optical transmitter 29 transmits the frame-multiplexed signal after optically modulating it with a wavelength $\lambda_{DOWN}$. The optical receiver 210 receives an optical signal from the ONTs and converts it into an electrical signal. The WDM coupler 211 couples/splits transmission and reception wavelengths.

On the other hand, as shown in FIG. 2B each of the ONTs includes a WDM coupler 217, an optical transmitter 218, an optical transmitter 219, a frame/time-slot demultiplexer 220, an Ethernet-PON ONT function processor 221, and a broadcast/image adapter 222. The WDM coupler 217 couples and splits transmission and reception wavelengths. The optical transmitter 218 transmits upstream data to the OLT. The optical receiver 219 receives an optical signal of $\lambda_{DOWN}$ from the OLT through the WDM coupler 217, and photo-electrically converts it. The frame/time-slot demultiplexer 220 separates the broadcast/image and Ethernet communication signals that have been multiplexed in a frame/time-slot multiplexing scheme. The Ethernet-PON ONT function processor 221 performs ONT functions. The broadcast/image adapter 222 recovers the separated broadcast/image signal into an original signal.

Figure 3:
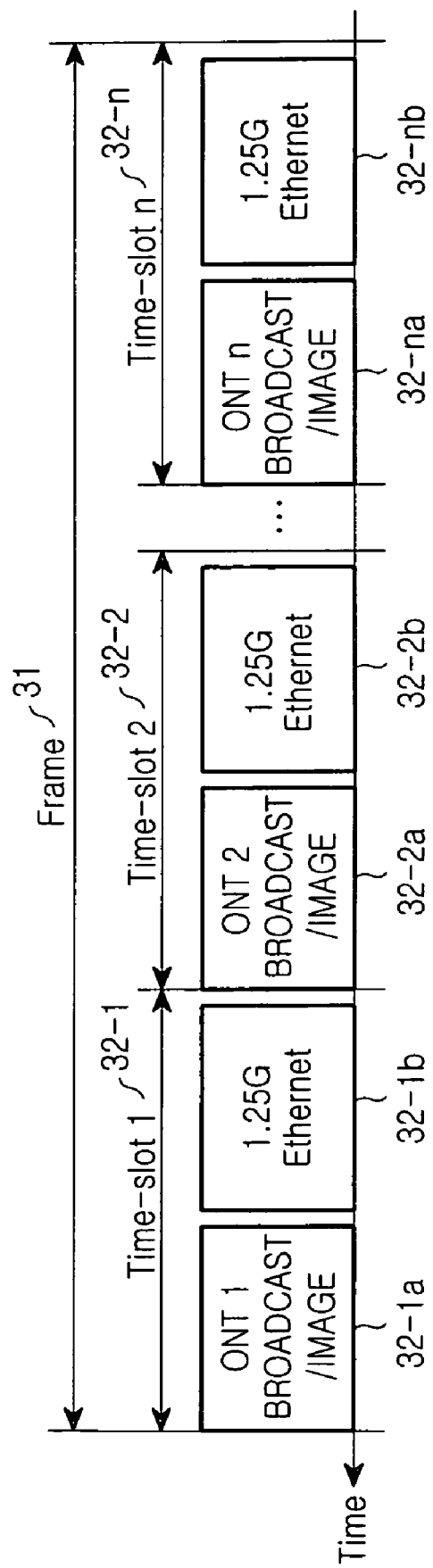
FIG. 3 shows a first example of a frame and time-slots for Broadcast/image and Ethernet communication signals according to the present invention.

FIG. 3 shows an example of a frame and time-slots for Ethernet communication and broadcast/image signals according to the present invention.

As shown in FIG. 3, a single frame 31 obtained by multiplexing broadcast/image signals and an Ethernet communication signal is divided into n time-slots 32-1, 32-2, . . . , 32-n. The time-slots 32-1, 32-2, . . . , 32-n include broadcast/image sub-time-slots 32-1a, 32-2a, . . . , 32-na and Ethernet sub-time-slots 32-1b, 32-2b, . . . , 32-nb, respectively. The broadcast/image sub-time-slots 32-1a, 32-2a, . . . , 32-na correspond to the subscribers, respectively.

The broadcast/image sub-time-slots 32-1a, 32-2a, . . . , 32-na in an i-th time-slot is necessarily filled with only a broadcast/image signal selected by an i-th ONT. In addition, the I-th time-slot is either left empty or filled with null data if there is no broadcast/image signal selected by the i-th ONT. The broadcast/image signal speed is 1.25 G/2k [b/s] (k=0, 1, 2, . . . ) in the case where the Ethernet communication speed is 1.25 GbE.

On the other hand, communication data for every ONT may be positioned in the Ethernet sub-time-slots of all time-slots. For example, only a broadcast/image signal selected by the first ONT may be necessarily positioned in the broadcast/image sub-time-slot 32-1a of the first time-slot 32-1. An Ethernet communication signal of every ONT may be filled in the Ethernet sub-time-slot 32-1b of the first time-slot 32-1. The same is true for other time-slots 32-2, . . . , 32-n.

Figure 4:
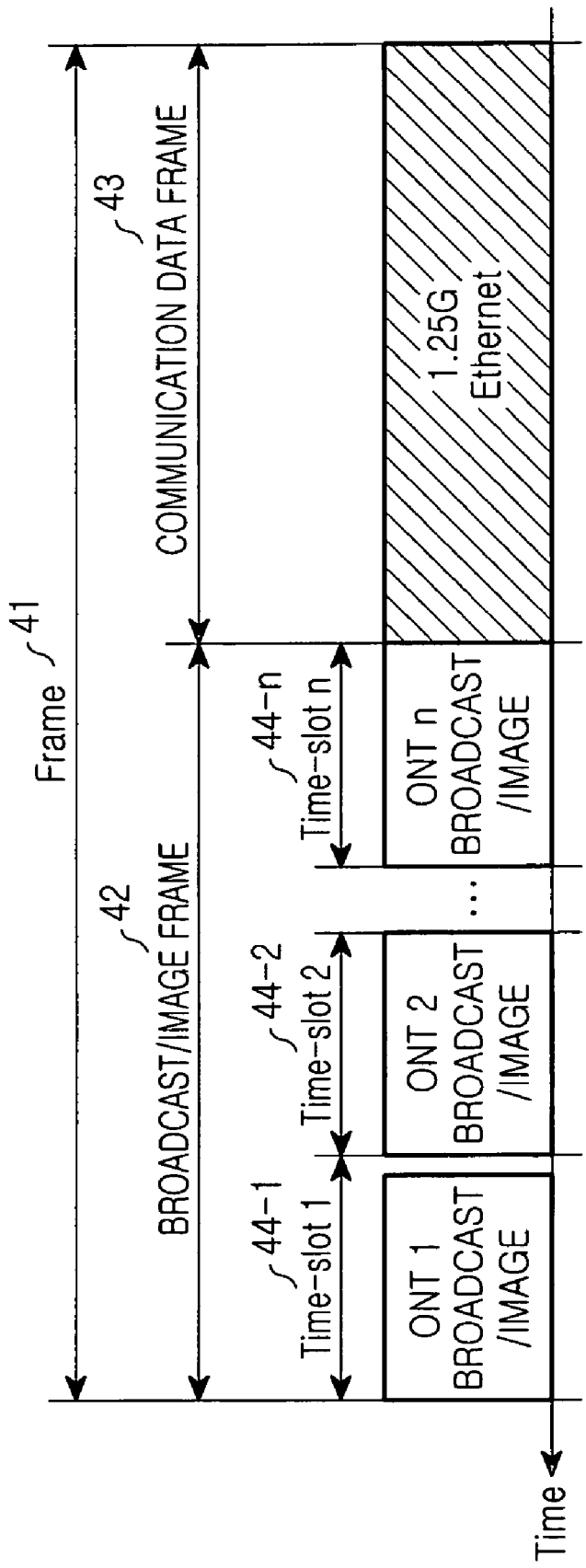
FIG. 4 shows a second example of a frame and time-slots for broadcast/image and Ethernet communication signals according to the present invention.

FIG. 4 shows a second example of a frame and time-slots for Ethernet communication and broadcast/image signals according to the present invention. As shown in this drawing, a single frame 41 is obtained by multiplexing broadcast/image signals and an Ethernet communication signal. The single frame includes a broadcast/image frame 42 and an Ethernet communication frame 43. The broadcast/image frame 42 is composed of time-slots 44-1, 44-2, . . . , 44-n, fixedly assigned to the ONTs, respectively.

There may be various frame and time-slot definitions according to the number of broadcast/image channels selected by users.

With reference to the frame and time-slot definition as shown in FIGS. 3 and 4 downstream communication (from the OLT to the ONTs) is performed in the following manner. First, as shown in the FIGS. 2A and 2B, an MPEG digital broadcast and image channels have been input to the broadcast/image channel selection switch 21. Each subscriber (or ONT) assigns a broadcast/image channel he or she desires to watch through a remote controller, and a signal thereof is transferred, as broadcast/image channel selection information 226, from the corresponding ONT to the broadcast/image channel selection controller 23 via the Ethernet-PON.

The broadcast channel selection controller 23 provides a control signal 21-2 to the broadcast/image channel selection switch 21, and controls the switch 21 based on the broadcast/image channel selection information 226 to switch to digital broadcast/image signals 214-1, 214, . . . , 214-n the subscribers (or ONTs) desire to watch, respectively. Here, the broadcast/image signals 214-1, 214-2, . . . , 214-n are selected by the first, second, . . . , n-th ONTs, respectively.

The switched broadcast/image signals are input to the broadcast/image time-slot multiplexer 22 to be formed according to the time-slot configuration defined in FIG. 3. The frame and time-slot is configured as shown in FIG. 3. It should be noted that the present invention is not limited thereto, i.e., the present invention may also adopt the frame and time-slot configuration as shown in FIG. 4.

Figure 5:
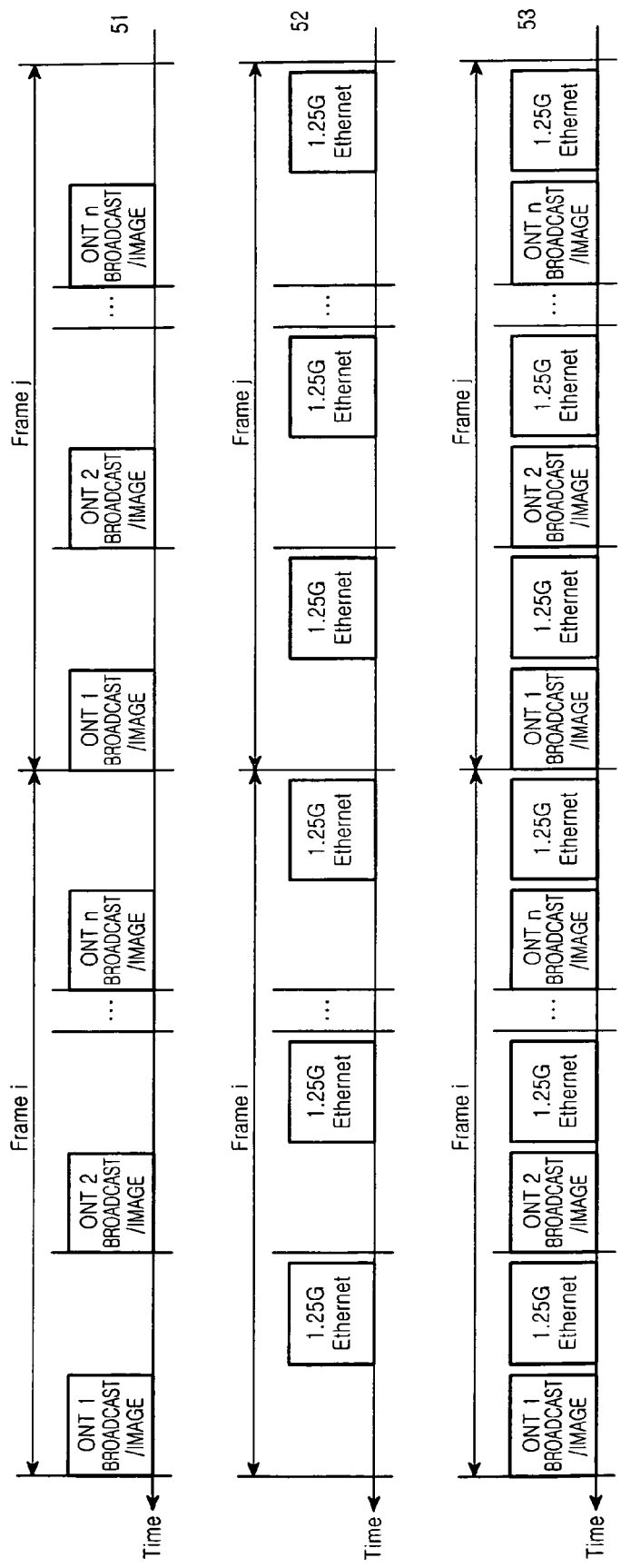
FIG. 5 illustrates a frame multiplexing procedure for broadcast/image and Ethernet communication signals according to the present invention.

The broadcast/image time-slot multiplexer 22 multiplexes broadcast/image signals inputted at a predetermined speed of R [b/s] in a time-slot multiplexing scheme, as denoted by "51" in FIG. 5, after converting it into a specific speed of 1.25 G/2k [b/s]. This specific speed of 1.25 G/2k [b/s] is just an example, and the present invention is not limited thereto. The input speed of R [b/s] is 27 Mb/s in the case where the inputted signals are MPEG-TS streams. As denoted by "51" in FIG. 5, broadcast/image signals selected by the ONTs are positioned in the sub-time-slots uniquely assigned to the ONTs as defined in FIG. 3, respectively.

An Ethernet communication signal transmitted from an upper level IP network is subjected to Ethernet-PON function processes at the Ethernet-PON function processor 25 after passing through the IP router 24. The communication signal is then input to the Ethernet time-slot matching buffer 28 so as to satisfy the Ethernet frame and time-slot definition as shown in FIG. 3.

The Ethernet communication signal stored in the Ethernet time-slot matching buffer 28 is outputted only at the Ethernet sub-time-slots defined as shown in FIG. 3, so as to have a format as denoted by "52" in FIG. 5.

The broadcast/image signal 51 output from the broadcast/image time-slot multiplexer 22 and the Ethernet communication signal 52 output from the Ethernet time-slot matching buffer 28 are frame-multiplexed by the frame multiplexer 27 as denoted by "53" in FIG. 5.

The frame-multiplexed broadcast/image and Ethernet communication signal is electro-optically converted into an optical signal having a wavelength $\lambda_{DOWN}$ at the optical transmitter 29, and then transmitted to the ONTs via the WDM coupler 211 and the 1×n optical splitter 216.

The downstream optical signal input to the ONT is received and photoelectrically converted by the optical receiver 219 after passing through the WDM coupler 217.

Figure 6:
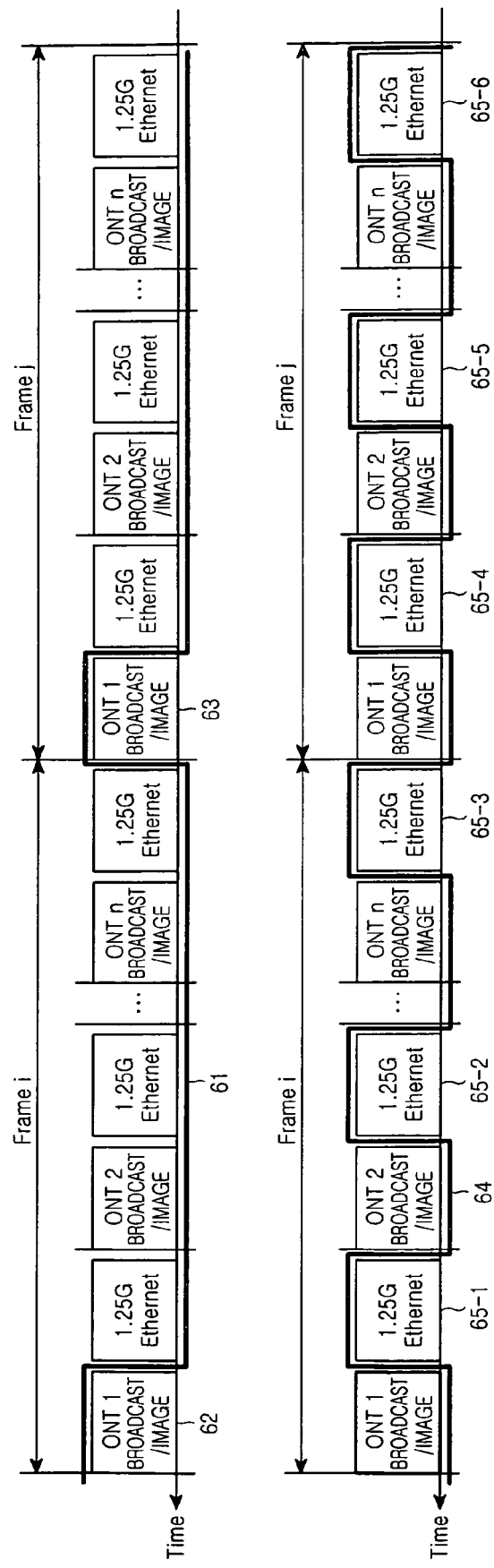
FIG. 6 illustrates a frame demultiplexing procedure for a frame-multiplexed broadcast/image and Ethernet communication signal according to the present invention.

The converted signal is then input to the frame and time-slot demultiplexer 220 so as to be separated into an Ethernet communication signal and a broadcast/image signal selected by the ONT. This demultiplexing operation is performed in the following manner. For example, in the first ONT, broadcast/image channels 62 and 63 selected by the first ONT are separated through a switching signal as denoted by "61" in FIG. 6, since the channels 62 and 63 are positioned in the first time-slot of the frame. On the other hand, Ethernet communication signals 65-1 to 65-6 are separated through a switching signal as denoted by "64" in FIG. 6. A synchronization problem occurring when separating the broadcast/image channel and communication data can be overcome by using a ranging-based synchronization, a function inherently provided by the Ethernet-PON.

Figure 7:
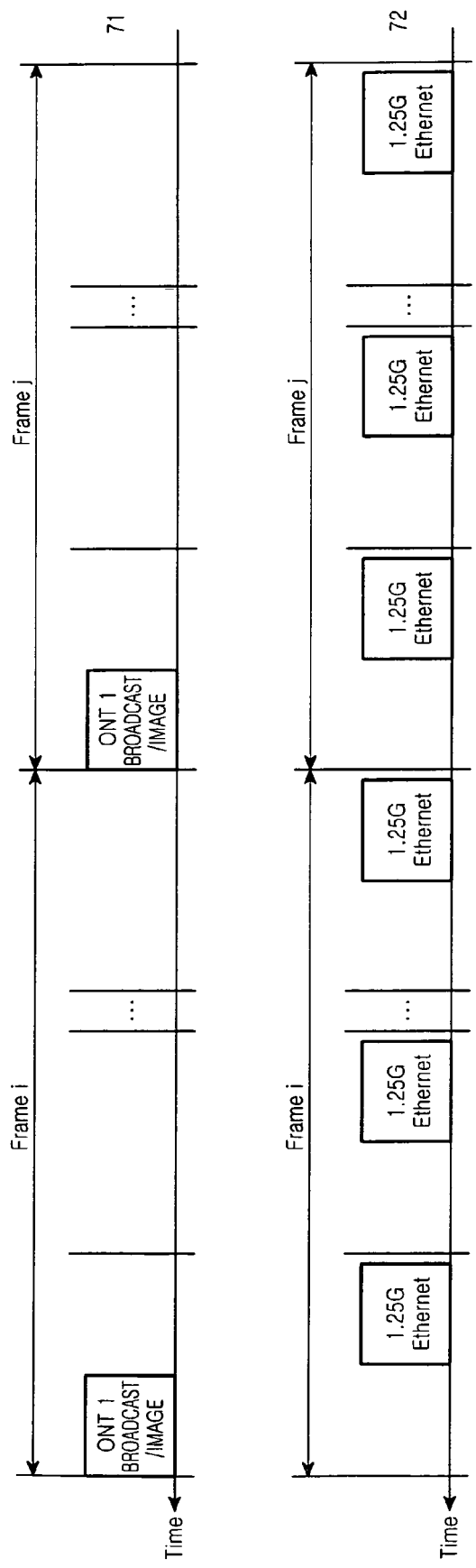
FIG. 7 illustrates frame-demultiplexed broadcast/image and Ethernet communication signals according to the present invention.

As shown in FIG. 7, the separated communication signal 223 (denoted by "72") is transmitted, as downstream communication data 227, to a terminal device such as a computer after passing through the ONT function processor 221.

At the broadcast/image adapter 222, the separated broadcast/image channel 224 (denoted by "71") is converted into the original speed of R [b/s] (27 Mb/s in the case of MPEG-TS stream signals), which is then transferred, as a digital broadcast/image signal 228, to an MPEG decoder, etc.

Next, upstream communication (from the ONTs to the OLT) is performed in the following manner. Each subscriber produces broadcast/image channel selection data or information 226 for watching a broadcast/image channel and IP communication data 225 through a computer, etc.

After overcoming problems such as data collision through the E-PON ONT function processor 221, the produced data is optically modulated into an optical signal having a wavelength $\lambda_{UP}$ at the optical transmitter 218. The converted optical signal is transmitted to the OLT via the WDM coupler 217 and the optical splitter 216.

Upstream data signals transmitted from the ONTs are photoelectrically modulated at the optical receiver 210 after passing through the WDM coupler 211 in the OLT. The modulated upstream signal is transferred to the Ethernet-PON 0 LT function processor 25. Of the data contained in this transferred signal, the broadcast/image channel selection information 21-3 is transferred from the Ethernet-PON OLT function processor 25 to the broadcast/image channel selection controller 23, and the IP communication data is transferred to an upper level IP network through the IP router 24.

Figure 8:
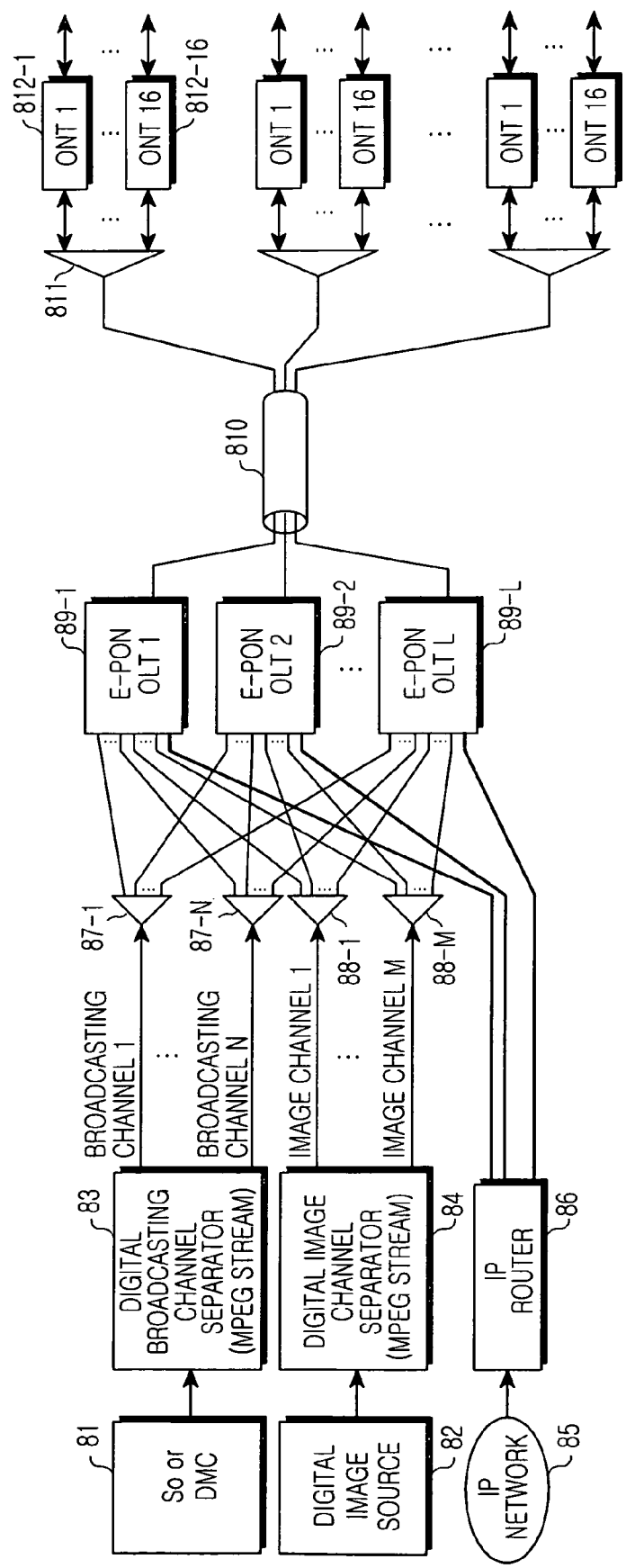
FIG. 8 shows the configuration of an example of a hybrid Ethernet-PON, including a plurality of Ethernet-PONs, for integrating broadcast and communication based on a TDM scheme according to the present invention.

FIG. 8 shows the configuration of an example of a hybrid Ethernet-PON, including a plurality of Ethernet-PONs for integrating broadcast and communication based on a TDM scheme.

As shown in FIG. 8, the hybrid Ethernet-PON for integrating broadcast and communication includes L OLTs and L×n ONTs, which operates in the following manner.

A digital broadcast signal transmitted from an SO (Service Operator) or DMC (Digital Medical Center) 81 is separated into N MPEG digital broadcast channels at a digital broadcast channel separator 83.

Each separated MPEG digital broadcast channel is split into L signals at a corresponding one of N splitters 87-1 to 87-N, which are transferred to L Ethernet-PON OLTs 89-1, 89-2, . . . , 89-L, respectively.

Digital image data transmitted from a digital image source 82 is separated into M MPEG digital image channels at a digital image channel separator 84. Each separated channel is split into L signals at a corresponding one of M splitters 88-1 to 88-M, which are transferred to the L Ethernet-PON OLTs 89-1, 89-2, . . . , 89-L, respectively.

Communication data transmitted from an IP network 85 is inputted to an IP router 86, through which it is routed to the L OLTs 89-1 to 89-L.

After being received by the OLTs 89-1, 89-2, . . . , 89-L, the digital broadcast/image and communication data is transmitted to the ONTs 812-1 to 812-16 via an optical cable 810 and an optical splitter 811, as described above in detail with reference to FIGS. 2A and 2B.

Figure 9A:
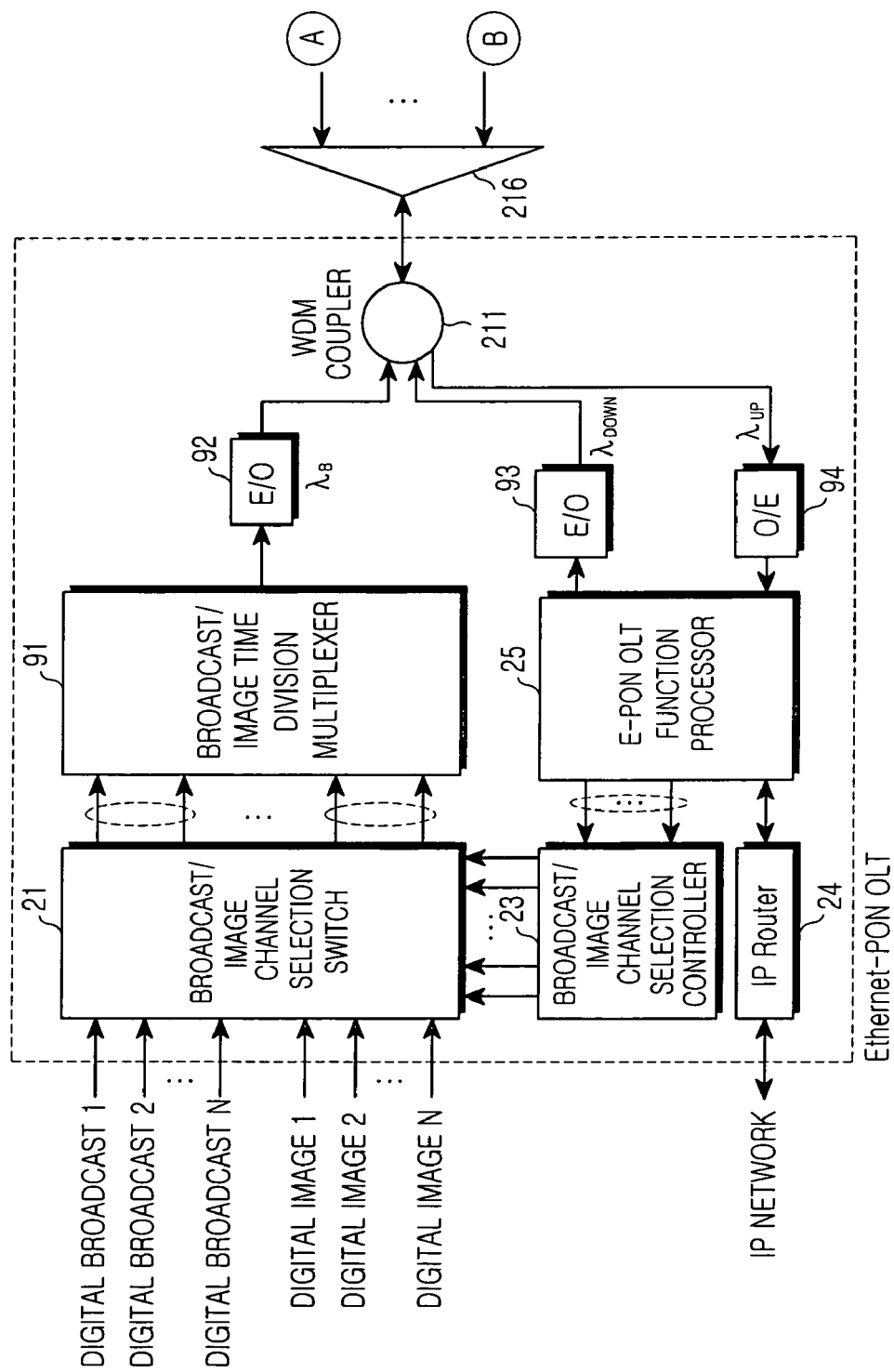
FIGS. 9A and 9B show the configuration of an Ethernet-PON employing an optical receiver and an optical transmitter separately provided for broadcast/image signals, according to another aspect of the present invention.
Figure 9B:
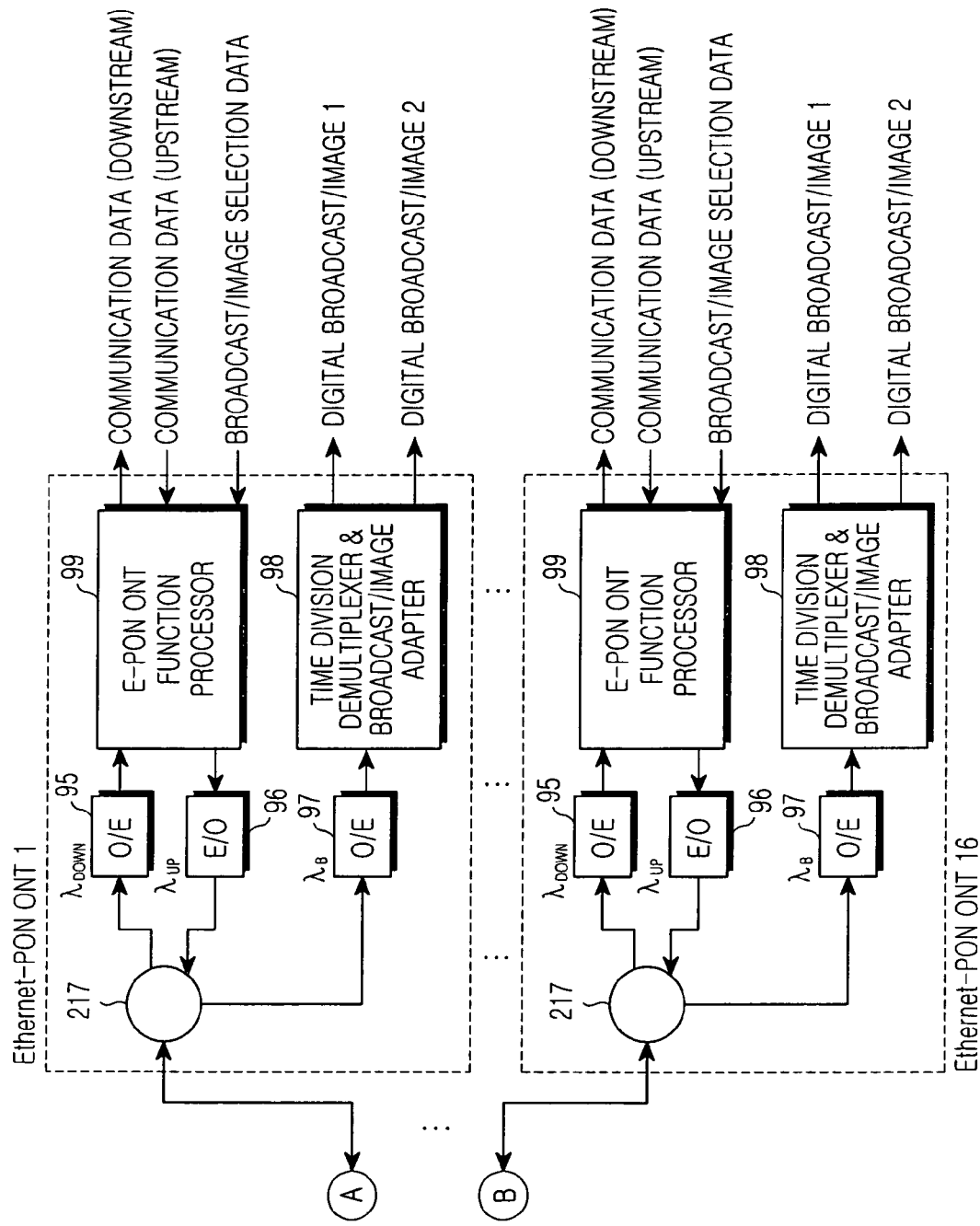

FIGS. 9A and 9B show the configuration of an Ethernet-PON employing an optical receiver and an optical transmitter separately provided for broadcast/image signals according to the present invention.

As shown in this drawing, the Ethernet-PON in this embodiment employs the optical receiver and transmitter separately provided for broadcast/image signals in order to secure a wide broadcast/image bandwidth.

This aspect of the invention is different from that shown in FIGS. 2A and 2B in that an Ethernet communication signal and broadcast/image signals are separately subjected to electro-optical conversion at an OLT so as to be transmitted, and time division multiplexing is thus required only for the broadcast/image signals. There is also no need for in this aspect to perform frame multiplexing, etc.

Accordingly, in the ONT, upstream and downstream Ethernet communication signals are all subjected to the operation of an Ethernet-PON ONT function processor 99 without being demultiplexed, whereas broadcast/image signals are subjected to time division demultiplexing and broadcast/image adaptation through a time division demultiplexer & broadcast/image adapter 98.

Figure 10:
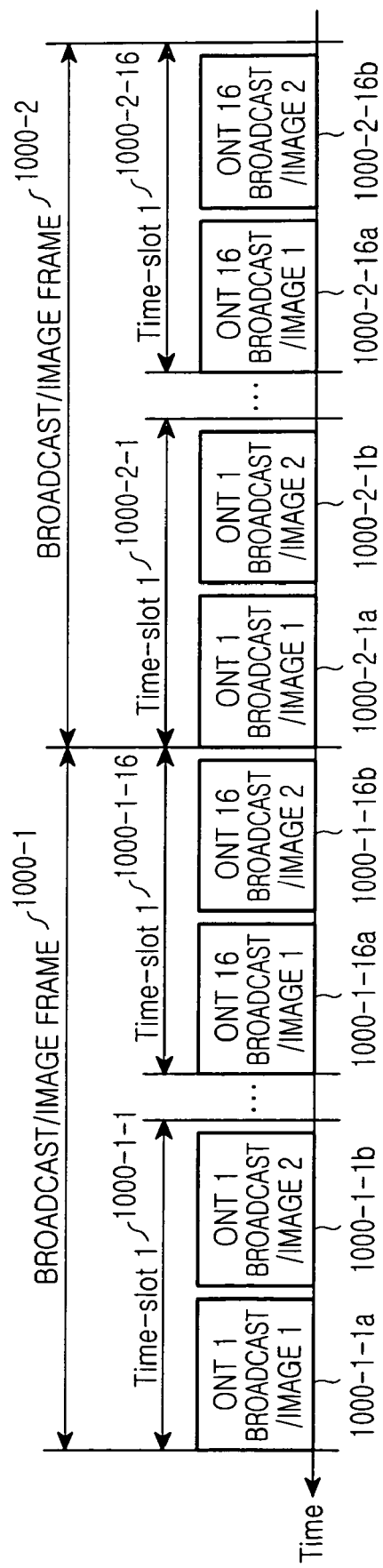
FIG. 10 illustrates time-slots for broadcast/image signals according to the illustrations in FIGS. 9A and 9B.

According to the invention, only time-slots, respectively, for the ONTs' broadcast/image signals are included in each frame as shown in FIG. 10, since only the broadcast/image signals are subjected to the time division multiplexing.

In other words, a broadcast/image frame 1000-1 or 1000-2 as shown in FIG. 10 is composed of time-slots 1000-1-1 to 1000-1-16 or 1000-2-1 to 1000-2-16, respectively, for broadcast/image signals of the ONTs. The time-slots 1000-1-1 to 1000-1-16 or 1000-2-1 to 1000-2-16 are each composed of a plurality of sub-time-slots (two sub-time-slots in this embodiment) 1000-1-1*a/b* to 1000-1-16*a/b* or 1000-2-1*a/b* to 1000-2-16*a/b* for accommodating broadcast/image signals.

The i-th time-slots are assigned to the i-th ONT, and only broadcast/image signals selected by the i-th ONT are necessarily positioned in the i-th time-slots. At least one sub-time-slot of the i-th time-slot is either left empty, or filled with null data, if there is only one or no broadcast/image channel selected by the i-th ONT. Here, the broadcast/image signal speed may be determined based on the number of broadcast/image signals required to be accommodated, etc.

For example, only broadcast/image signals selected by the first ONT are necessarily positioned in the broadcast/image sub-time-slots 1000-1-1*a/b* or 1000-2-1*a/b* of the first time-slot 1000-1-1 or 1000-2-1. Likewise, only broadcast/image signals selected by the sixteenth ONT are necessarily positioned in the broadcast/image sub-time-slots 1000-1-16*a/b* or 1000-2-16*a/b* of the sixteenth time-slot 1000-1-16 or 1000-2-16. The same is true for other time-slots.

Figure 11:
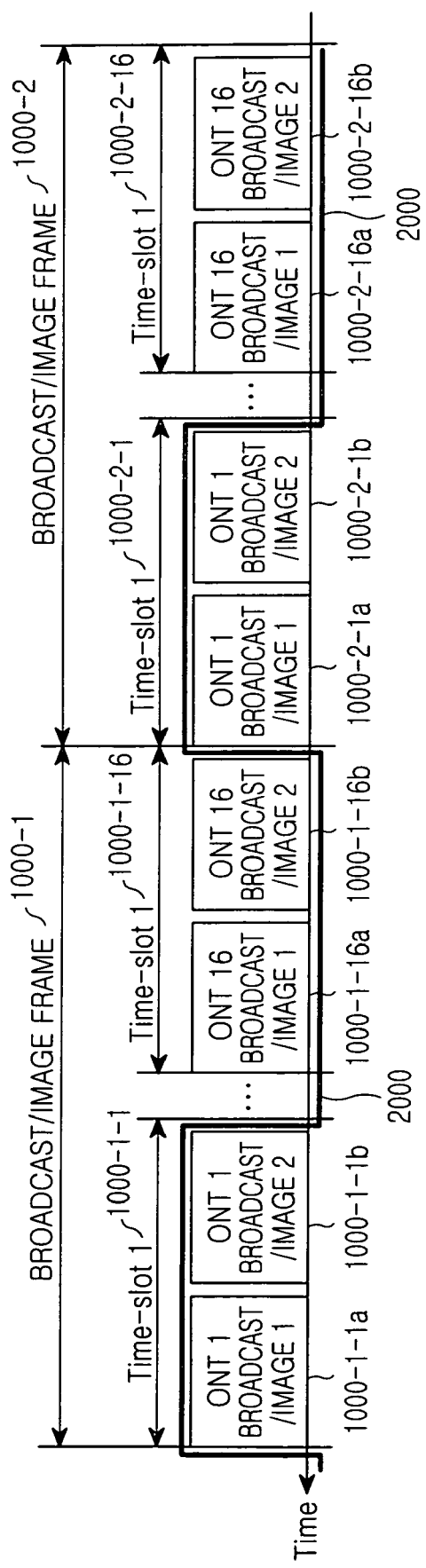
FIG. 11 illustrates time division demultiplexing on time-slots for broadcast/image signals, according to the illustrations in FIGS. 9A and 9B.

FIG. 11 illustrates that desired broadcast/image time-slots are separated from time-division-multiplexed frames, according to the present invention exemplified in FIGS. 9A and 9B. As shown in FIG. 11, time-slots assigned to the corresponding ONT may be selected through a switching signal as denoted by "1001".

Figure 12:
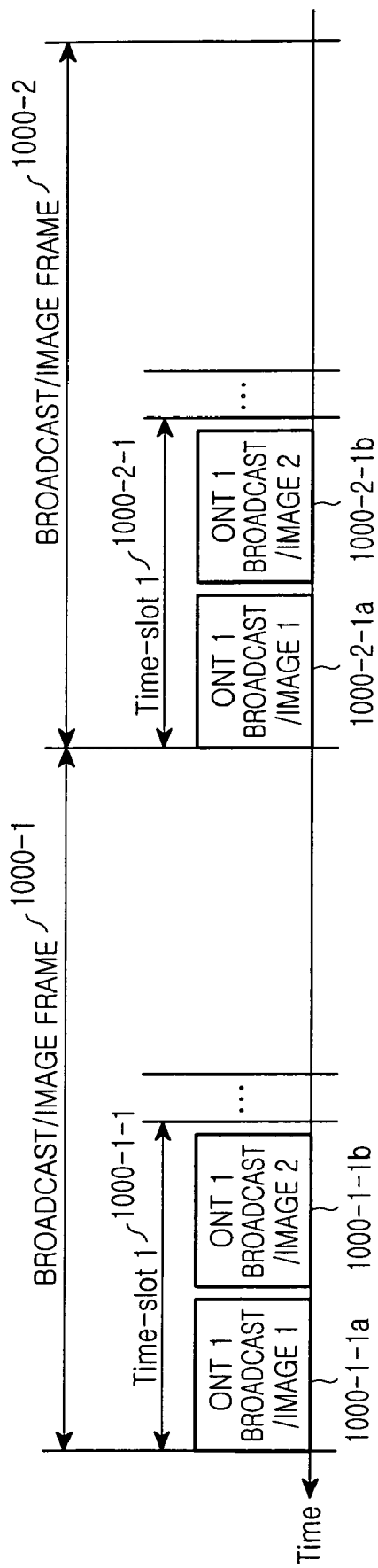
FIG. 12 illustrates broadcast/image channels separated by the time division demultiplexing on the time-slots for broadcast/image signals, according to the illustrations in FIGS. 9A and 9B.

FIG. 12 illustrates a broadcast/image signal separated from the signal shown in FIG. 11 through the switching signal 1001.

The operation of the Ethernet-PON in FIGS. 9A and 9B will now be described with reference to FIGS. 10 to 12.

Broadcast/image channels, corresponding respectively to the subscribers, selected at a broadcast/image channel selection switch 21 are inputted to a broadcast/image time division multiplexer 91. At this multiplexer 91, the selected signals are multiplexed in a TDM scheme according to the time-slot location definition as shown in FIG. 10. Here, the broadcast/image signal speed is R [b/s], and the TDM (Time Division multiplexed) broadcast/image signal speed is K [b/s].

Through an optical transmitter 92, the TDM broadcast/image signal is optically modulated and transmitted to the ONTs. The transmitted signal is received by an optical receiver 97 in an ONT.

The ONT must select a broadcast/image channel selected by it, since the received broadcast/image signal includes all broadcast/image channels selected by all the ONTs. For example, a broadcast/image channel selected by the first ONT, corresponding to the time-slots 1000-1-1 and 1000-2-1, is separated from broadcast/image data received by the first ONT, as shown in FIG. 12, through the switching signal 2000 of FIG. 11 at a time division demultiplexer & broadcast/image adapter 98 in the first ONT, since the received broadcast/image data includes all the broadcast/image channels selected by all the ONTs, as shown in FIG. 11. The separated broadcast/image signals are converted into an original data speed of R [b/s] at a broadcast/image adapter portion in the time division demultiplexer & broadcast/image adapter 98. The converted signals are transmitted to an MPEG decoder, etc.

As apparent from the above description, an Ethernet-PON for integrating broadcast and communication based on a TDM scheme according to the present invention has the following advantages. Since broadcast channels desired by users are selected at an OLT to be transmitted to ONTs, it is possible for the ONTs to use a low cost, low spec optical receiver for receiving broadcast signals, instead of an EDFA for a large amount of broadcast signals.

In addition, it is possible to ensure QoS (Quality of Service) in transmitting not only digital broadcast signals but also high-image-quality digital image signals that will be required by future users.

Further, broadcast information is transmitted through a communication data line in the Ethernet-PON, thereby enabling bi-directional broadcasting functions.

Although the preferred aspects of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An Ethernet-PON (Passive Optical Network) for integrating broadcast and communication based on a TDM (Time Division Multiplexing) scheme,
   an OLT (Optical Line Terminal) configured (i) to perform a switching operation on a plurality of digital broadcast/image data received from an external broadcast provider according to respective broadcast/image selection information transmitted from users, (ii) to perform a time division multiplexing on the digital broadcast/image data to convert the digital broadcast/image data into a broadcast/image signal, (iii) to perform a frame-multiplexing on the broadcast/image signal and communication data received through an IP (Internet Protocol) network into a single frame, (iv) to electro-optically convert the single frame, and (v) to transmit the electro-optically converted signal;
   a plurality of ONTs (Optical Network Terminals), each ONT adapted to receive an optical signal from the OLT, the ONT configured to photoelectrically convert the received optical signal, to perform a frame & time-slot demultiplexing on the photoelectrically converted signal, to output the communication data and the selected broadcast/image data included in the photoelectrically converted signal to a corresponding user, and to receive a communication signal and the broadcast/image selection information from one of the users to output them to the OLT; and
   an optical splitter arranged in a path between the OLT and the plurality of ONTs, said optical splitter splitting a signal from the OLT into the plurality of ONTs, coupling signals from the plurality of ONTs, and transmitting the coupled signal to the OLT; and
   wherein the OLT includes:
   a broadcast/image channel selection switch configured to receive and switching external MPEG (Motion Picture Experts Group) broadcast and image data,
   a broadcast/image time-slot multiplexer configured to assign broadcast/image channels, output from the broadcast/image channel selection switch, to a time-slot assigned to each user so as to multiplex the channels;
   an Ethernet-PON OLT function processor configured to perform Ethernet-PON OLT functions;
   an IP router configured to route a communication signal to an upper level IP network or to the Ethernet-PON OLT function processor;
   an Ethernet time-slot matching buffer configured to store the communication data from the Ethernet-PON OLT function processor that is transmitted to the OLT and to prepare the communication data to be frame multiplexed;
   a frame multiplexer configured to multiplex the time-slot-multiplexed broadcast/image signal from the broadcast/image time-slot multiplexer and the communication signal stored in the Ethernet time-slot matching buffer into a single frame;
   a first optical transmitter configured to optically modulate a frame-multiplexed signal outputted from the frame multiplexer, and transmitting the modulated signal as an optical signal of $\lambda_{DOWN}$; and
   a first optical receiver configured to receive an optical signal from the ONTs and converting the optical signal into an electrical signal.

2. The Ethernet-PON according to claim 1, wherein each of the plurality of ONTs includes:
   a second optical receiver configured to receive the signal transmitted as the optical signal of $\lambda_{DOWN}$ from the OLT, and photoelectrically converting the optical signal;
   a second optical transmitter configured to electro-optically convert upstream data and transmitting the upstream data to the OLT;
   a frame/time-slot demultiplexer configured to separate the frame/time-slot-multiplexed broadcast/image and communication signals;
   an Ethernet-PON ONT function, processor configured to receive the communication signal from the frame/time-slot demultiplexer and to perform ONT functions; and
   a broadcast/image adapter configured to recover a time-slot-format broadcast/image signal, separated by the frame/time-slot demultiplexer, into an original signal.

3. The Ethernet-PON according to claim 1, wherein the single frame obtained by multiplexing the broadcast/image signal and the communication signal is divided into a predetermined number of time-slots, and each of the time-slots includes a broadcast/image sub-time-slot containing a broadcast/image signal and an Ethernet sub-time-slot containing a communication signal.

4. The Ethernet-PON according to claim 3, wherein the broadcast/image sub-time-slot contains a broadcast/image signal selected by one of the ONTs corresponding to said time-slot's order, and said time-slot being left empty if there is no broadcast/image signal selected by the ONT.

5. The Ethernet-PON according to claim 3, wherein the Ethernet sub-time-slot contains communication data of every ONT.

6. The Ethernet-PON according to claim 3, wherein the broadcast/image time-slot contains a broadcast/image signal selected by one of the ONTs corresponding to said time-slot's order, said time-slot being filled with null data if there is no broadcast/image signal selected by the ONT.

7. The Ethernet-PON according to claim 1, wherein the single frame obtained by multiplexing the broadcast/image signal and the communication signal is divided into a sub-frame for broadcast/image signals and a sub-frame for Ethernet communication signals, the sub-frame for broadcast/image signals including broadcast/image time-slots that contain broadcast/image signals of the ONTs.

8. An Ethernet-PON for integrating broadcast and communication based on a TDM scheme, comprising:
an OLT configured (i) to perform a switching operation on a plurality of digital broadcast/image data received from an external broadcast provider according to broadcast/image selection information transmitted from users; (ii) to perform a time division multiplexing on the digital broadcast/image data to convert the digital broadcast/image data into a broadcast/image signal; (iii) to electro-optically convert the broadcast/image signal into a broadcast/image optical signal of $\lambda_B$; (iv) to electro-optically convert communication data received from an IP network into a communication optical signal of $\lambda_{DOWN}$; (v) to couple the broadcast/image optical signal of $\lambda_B$ and the communication optical signal of $\lambda_{DOWN}$ into a single optical signal; and (vi) to transmit the single optical signal;
a plurality of ONTs, each ONT configured to receive an optical signal from the OLT; to separate the received optical signal into the broadcast/image optical signal of $\lambda_B$ and the communication optical signal of $\lambda_{DOWN}$; to photoelectrically convert the two separated signals; to perform time division demultiplexing on the photoelectrically convened broadcast/image signal to convert the photoelectrically converted broadcast/image signal into the broadcast/image data; to output the broadcast/image data and the photoelectrically convened communication signal to a corresponding user; and to receive a communication signal and the broadcast/image selection information from the user to output them to the OLT; and
an optical splitter configured to split a signal from the OLT into the plurality of ONTs, coupling signals from the plurality of ONTs, and transmitting the coupled signal to the OLT, wherein, the OLT includes:
a broadcast/image channel selection switch configured to receive, to switch and to output an external MPEG broadcast and image data;
a time division multiplexer configured to assign broadcast/image channels output from the broadcast/image channel selection switch to time-slots assigned respectively to the users, so as to multiplex the channels in a TDM scheme;
a first optical transmitter configured to optically modulate the time-division-multiplexed broadcast/image signal;
an Ethernet-PON OLT function processor configured to perform Ethernet-PON OLT functions;
an IP router configured to route communication data to an upper level IP network or to the Ethernet-PON OLT function processor;
a second optical transmitter configured to optically modulate communication data to be transmitted to the plurality of ONTs;
a first optical receiver configured to receive an optical signal from the plurality of ONTs, converting the optical signal into an electrical signal, and transferring the converted signal to the Ethernet-PON OLT function processor;
a broadcast/image channel selection controller configured to receive the broadcast/image selection information from the plurality of ONTs through the Ethernet-PON OLT function processor, and transferring a control signal to the broadcast/image channel selection switch to allow the broadcast/image channel selection switch to select broadcast/image channels corresponding respectively to the plurality of ONTs; and
a first WDM coupler configured to couple the optically modulated communication signal of $\lambda_{DOWN}$ and the optically modulated broadcast/image signal of $\lambda_B$, and to output the coupled signal.

9. The Ethernet-PON according to claim 8, wherein the time-division-multiplexed broadcast/image signal includes time-slots for broadcast/image signals corresponding respectively to the plurality of ONTs, each of the time-slots including a predetermined number of sub-time-slots for accommodating the same predetermined number of broadcast/image signals.

10. An OLT (Optical Line Terminal) of am Ethernet-PON for integrating broadcast and communication based on a TDM for transmission to one or more users, said OLT (Optical Line Terminal) being configured: (i) to perform a switching operation on a plurality of digital broadcast/image data received from an external broadcast provider according to respective broadcast/image selection information transmitted from users, (ii) to perform a time division multiplexing on the digital broadcast/image data to convert the digital broadcast/image data into a broadcast/image signal, (iii) to perform a frame-multiplexing on the broadcast/image signal and communication data received through an IP (Internet Protocol) network into a single frame, (iv) to electro-optically convert the single frame, and (v) to transmit the electro-optically converted signal, wherein said OLT comprises:
a broadcast/image channel selection switch configured to receive and switching external broadcast and image data,
a broadcast/image time-slot multiplexer configured to assign broadcast/image channels, output from the broadcast/image channel selection switch, to a time-slot assigned to each user so as to multiplex the channels;
an Ethernet-PON OLT function processor configured to perform Ethernet-PON OLT functions;
an IP router configured to route a communication signal to an upper level IP network or to the Ethernet-PON OLT function processor;
an Ethernet time-slot matching buffer configured to store the communication data from the Ethernet-PON OLT function processor that is transmitted to the OLT and to prepare the communication data to be frame multiplexed;
a frame multiplexer configured to multiplex the time-slot-multiplexed broadcast/image signal from the broadcast/image time-slot multiplexer and the communication signal stored in the Ethernet time-slot matching buffer into a single frame;

a first optical transmitter configured to optically modulate a frame-multiplexed signal outputted from the frame multiplexer and transmitting the modulated signal as an optical signal of $\lambda_{DOWN}$; and a first optical receiver configured to receive an optical signal from the users via one or more ONTs (Optical Network Terminals) and converting the optical signal into an electrical signal.

11. The Ethernet-PON according to claim 10, wherein the single frame obtained by multiplexing the broadcast/image signal and the communication signal is divided into a predetermined number of time-slots, and each of the time-slots includes a broadcast/image sub-time-slot containing a broadcast/image signal and an Ethernet sub-time-slot containing a communication signal.

12. The OLT according to claim 10, wherein the single frame obtained by multiplexing the broadcast/image signal and the communication signal is divided into a sub-frame for broadcast/image signals and a sub-frame for Ethernet communication signals, the sub-frame for broadcast/image signals including broadcast/image time-slots that contain broadcast/image signals for a plurality of ONTs.

13. The OLT according to claim 12, wherein the broadcast/image time-slot contains a broadcast/image signal selected by one of the ONTs corresponding to said time-slot's order, said time-slot being left empty if there is no broadcast/image signal selected by the ONT.

14. The OLT according to claim 12, wherein the sub-frame for Ethernet communication signals contains communication data of every ONT.

15. The Ethernet-PON according to claim 12, wherein the broadcast/image sub-time-slot contains a broadcast/image signal selected by one of the ONTs corresponding to said time-slot's order, and said time-slot being filled with null data if there is no broadcast/image signal selected by the ONT.

16. The OLT according to claim 10, wherein the switching operation, which the OLT is configured to perform, comprises selecting a broadcast/image data channels from a plurality of broadcast/image channels, which received from an external broadcast provider, according to the broadcast/image selection information transmitted from each user.

* * * * *